United States Patent

Watts

[15] 3,641,444
[45] Feb. 8, 1972

[54] BASELINE COMPENSATING INTEGRATOR

[72] Inventor: Geoffrey P. Watts, Los Alamos, N. Mex.
[73] Assignee: The United States of America as represented by the United States Atomic Energy Commission
[22] Filed: Sept. 1, 1970
[21] Appl. No.: 68,712

[52] U.S. Cl. ........................328/127, 73/190 R, 235/151.3, 328/128, 328/151, 328/163, 328/165
[51] Int. Cl. .............................................G06g 7/18
[58] Field of Search.................328/127, 128, 139, 151, 162, 328/163, 165, 185; 73/15 B, 190 R, 361; 235/151.3

[56] References Cited

UNITED STATES PATENTS

| | | |
|---|---|---|
| 3,360,993 | 1/1968 | MacMillan................................73/361 |
| 3,374,435 | 3/1968 | Engel..................................328/162 X |
| 3,434,062 | 3/1969 | Cox...........................................328/163 |
| 3,450,867 | 6/1969 | Blum et al..........................235/151.3 |
| 3,473,382 | 10/1969 | Tabeling..................................73/15 B |
| 3,475,600 | 10/1969 | Spence................................328/162 X |
| 3,515,343 | 6/1970 | Schwartzenberg et al........328/151 X |
| 3,580,243 | 5/1971 | Johnson.............................328/151 X |
| 3,584,309 | 6/1971 | Nicolson............................328/151 X |

Primary Examiner—Donald D. Forrer
Assistant Examiner—R. C. Woodbridge
Attorney—Roland A. Anderson

[57] ABSTRACT

A device to compensate for predictable variations from a baseline. A circuit stores information sufficient to predict the variation from the baseline and this variation is later subtracted from the total signal by a difference amplifier. A total area integrator may be used with the device to provide additional information.

1 Claims, 2 Drawing Figures

BASELINE COMPENSATING INTEGRATOR

The invention described herein was made in the course of, or under, a contract with the U.S. ATOMIC ENERGY COMMISSION.

This invention relates to an electronic device that will compensate for variations from the baseline. Prior art devices have had the disadvantage of having difficult to interpret output information because of a masking effect created by the analyzing equipment.

This invention provides a device that can be used with various types of analyzing equipment to clarify the output signal and has particular utility in connection with differential calorimeters. A calorimeter is built so that the temperature of the calorimeter increases linearly with time, and the quantity desired is the heat of fusion of a substance. The output signal is proportional to the power applied to the heaters, and the sample size is small compared to the calorimeter mass, so that the output signal will be a large, nearly constant signal with a superimposed small peak. The indicated curvature in the baseline is due to the change in heat capacity of the calorimeter as temperature is increased. If now a differential calorimeter of perfect construction is used, the output signal is proportional to the difference in power applied to the two calorimeters, with both calorimeter temperatures exactly equal at all times, even though both temperatures are increasing. It is assumed that the sample is balanced in the other calorimeter by a mass of equal heat capacity above and below the temperature of fusion of the sample. The output contains no contribution from the calorimeter mass itself, permitting considerably more amplification of the output signal and more accuracy in measurement. The device of this invention will take data from a differential calorimeter and automatically compensate for the baseline slope and integrate the resulting corrected curve. The use of this device has made it possible to speed up the data reduction process by a factor of approximately 50 and to increase the accuracy attainable by approximately a factor of 20. Prior art devices have required a long and not very accurate process involving projection of the baseline by means of a straight edge and pencil and integration of the curved area by means of a planimeter. The height of the peak as a function of temperature is read by means of a ruler.

To describe the operation of the baseline compensating integrator it will first be necessary to describe, in an elementary manner, the operation of analog computing elements. The following description is confined to the DC and low-frequency region. The term "operational amplifier" was originally used in the computing field to describe amplifiers performing various mathematical operations. It was found that, by proper application of negative feedback around a high gain DC amplifier, the characteristics of the total circuit could be made to depend, to a high accuracy, only upon the stable feedback elements, and the ordinary variability of amplifier characteristics could be almost entirely eliminated. Operational amplifier circuits could be used to perform accurately the functions of amplification, inversion, addition, subtraction, and integration.

It is therefore an object of this invention to provide means to compensate for predictable variations from a baseline.

Other objects and advantages of the invention will become apparent from a consideration of the following detailed description when taken in conjunction with the accompanying drawings wherein.

A preferred embodiment of this invention is as follows. The table indicates the relay A and relay B positions during all portions of the operating cycle. Amplifiers 1 and 2 amplify the input signal from the differential calorimeter from $\pm 10$ to $\pm 110$ millivolts to $\pm 10$ volts. The gain and zero offset provide convenient means for fine adjustment of the variables. A differential input stage was chosen to avoid ground loop problems and to cancel out any DC potentials between the ground systems of the two instruments. Amplifier 2 is a standard inverting amplifier. The output of amplifier 2 is the amplified differential calorimeter output modified by the setting of the zero offset control. Amplifier 6, 4, and 7 generate the projected baseline which, because of a polarity (sign) inversion, subtracts from the height output of amplifier 2 at the output of amplifier 3. The projected baseline is first amplified by 5 and then divided by 5 when it is subtracted from the original signal. The process of multiplying and then dividing by 5 utilizes more of the full-scale range of the amplifiers to minimize the effects of amplifier input offset voltage and current in the projected baseline generating circuits. The output of amplifier 3 is the scaled calorimeter signal corrected by subtracting the drifting baseline.

The table indicates the timing relay sequence. The start, stop, and reset functions are controlled by pushbuttons. The integrate function starts precisely 1, 2, or 5 minutes after the start pushbutton is depressed unless the baseline compensating integrator is synchronized to the differential calorimeter. When the units are synchronized the start function is delayed until the next closure in the calorimeter synchronizer after the start pushbutton is depressed.

TABLE

| | Relay A | Relay B | Comments |
| --- | --- | --- | --- |
| RESET | }Off (as shown) | Off (as shown) | }Standby. |
| START | Relay A On, Time=$T_0$ | | |
| | }On | Off | }Baseline sample. |
| INTEGRATE | $T=T_1$ | Relay B On | |
| | }On | On | }Integrate and generate baseline. |
| STOP (HOLD) | Relay A Off, Time=$T_2$ | | |
| | }Off (as shown) | On | }Hold answers. |
| RESET | | Relay B Off (as shown) | |

$T_1 = T_0 - 1, 2,$ or 5 min.

Figure 1:
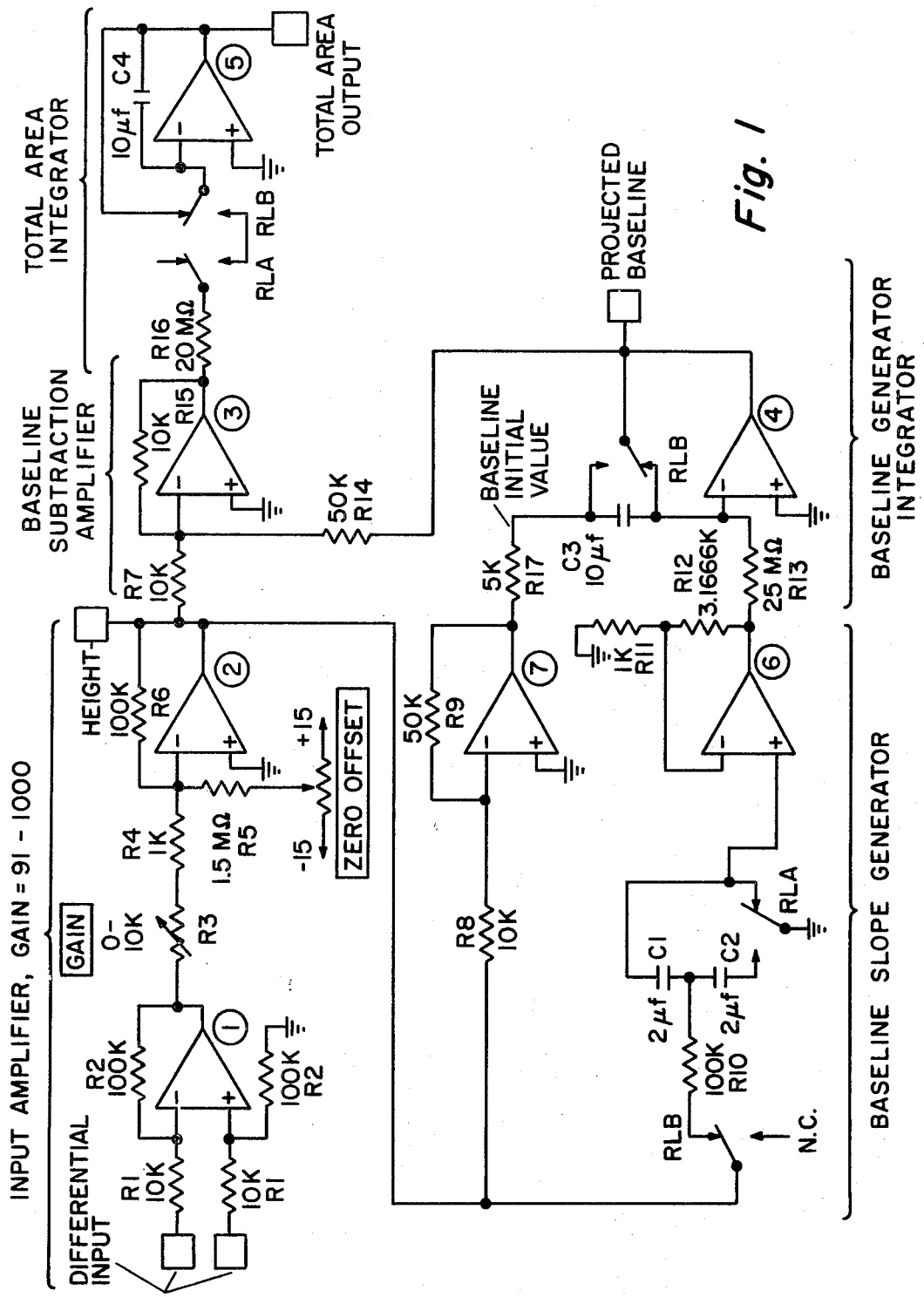
FIG. 1 is a circuit diagram of the analog portion of the baseline compensating integrator of this invention showing only one position of the selector switches, eliminating circuit trimming controls, and not showing timing or readout circuits.

When the start function is initiated, relay A (see FIG. 1) closes leaving the charge (voltage) stored on capacitor C1 at time $T_0$, and transfers the height signal to capacitor C2. At time $T_1$, (1, 2, or 5 minutes later) relay B closes, isolating the height signal from both capacitors and leaving the lower end of C2 grounded. Because of the configuration of the circuit, the difference in base height is the input to amplifier 6 at time $T_1$. The input current to either summing junction on amplifier 6 is approximately $10^{-12}$ amps; the input voltage drift is of the order of 1 microvolt per second, which for this purpose is negligible. The output from amplifier 6 is amplified to 4.1666 times the input. The time constants shown in FIG. 1 are for the 5-minute integration time. Instead of a gain of five in amplifier 6 and a 300 sec. R13 × C3 time constant, a gain of 4.1666 and a R13 × C3 time constant of 250 sec. was chosen to simplify the selection of the high value resistors R13. Amplifier 7 multiplies the height by 5 and, during the off period of relay B, charges C3 to this value. Because the output of amplifier 4 is connected to the input during the off period of relay B, the lower end of C3 is held at ground potential during this time. When relay B switches on, the output of amplifier 4 abruptly changes to the baseline initial value and starts generating the projected linear baseline because the output of amplifier 6 is a constant voltage after relay B switches on. The net result is that the projected baseline, five times larger than the original baseline and inverted in sign, is generated at the output of amplifier 4. The projected baseline is divided by 5 by the R15/R14 resistors connected to amplifier 3 and accurately cancels the original baseline slope at the output of amplifier 3 as long as the original input baseline maintains a precisely linear character. Amplifier 5 integrates the corrected height signal after relay A and B have both turned on. The values (R16 and C4) shown in FIG. 1 are for the 200 sec. integration constant. An additional factor of 10 is implied in the R16 × C4 time constant to obtain the volt-sec. figure because the full-scale output of the amplifiers is 10 volts. The output of amplifier 5 is the total area under the corrected height curve from the start of integration until the integration is cut off by depressing the stop pushbutton. An additional integration on-off switch (not shown in FIG. 1) allows the integration to be stopped and restarted manually if subsidiary undesired peaks are present.

Figure 2:
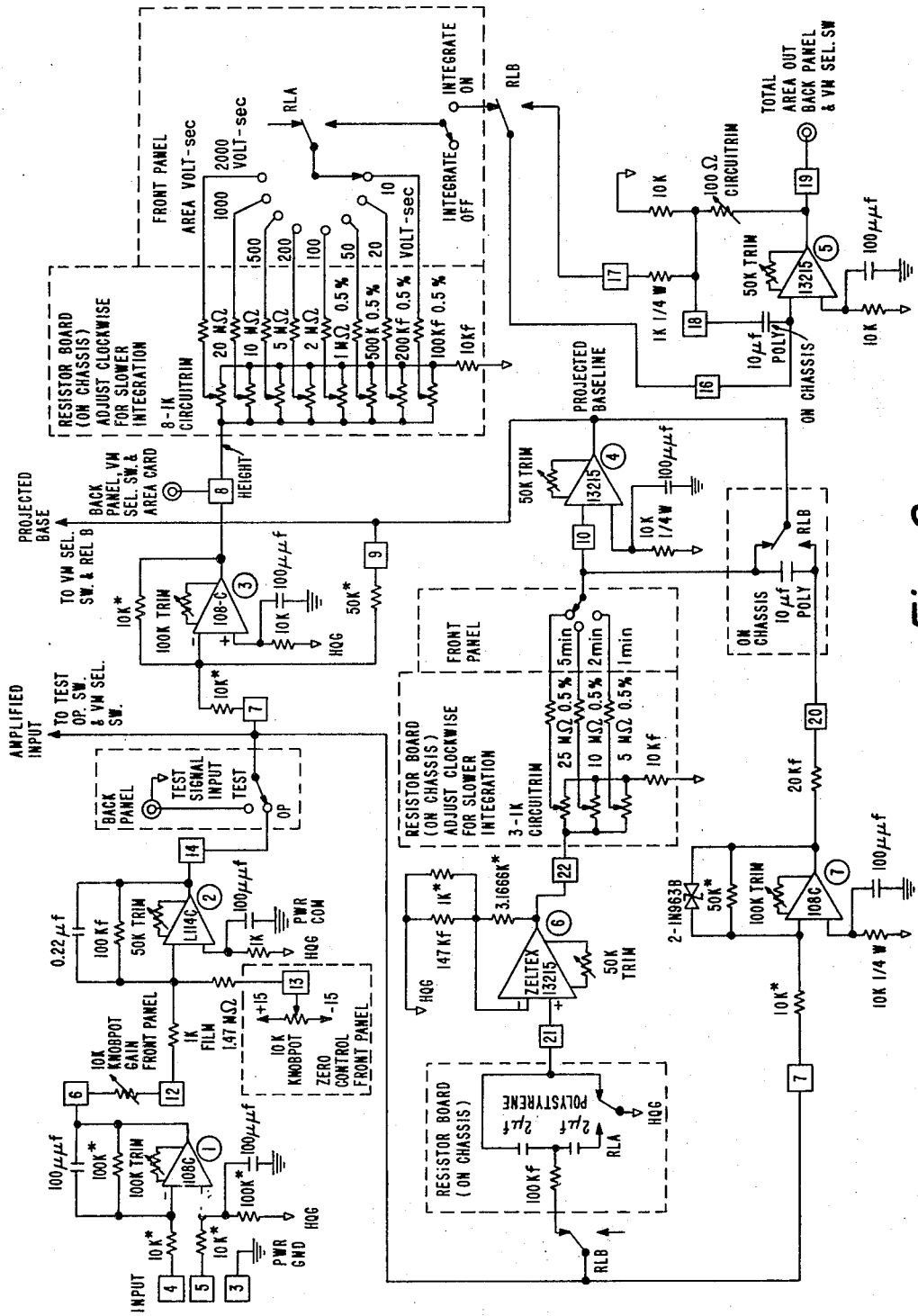
FIG. 2 is a circuit diagram of the device of this invention and in particular shows the selector switches, circuit trimming controls, and timing or readout circuits.

FIG. 2 shows the entire circuit diagram of this invention including those circuits which are not novel, and in particular, the timing circuit powered by a 60 Hertz powerline frequency which operates the relays and permits the readout on the digital voltmeter at precisely selected intervals, the circuit diagram of said digital voltmeter, the selector switches in various modes other than that described and shown in FIG. 1, pertinent power supplies with their accompanying circuitry, and circuit trimming controls. These circuits are not part of this invention and therefore are not described in any further detail other than their function as stated in the description of FIG. 1.

A simplified operational mode of this device is as follows: The differential scanning calorimeter output, which is normally used to drive a recorder, is amplified by a factor of 1,000 from 10 millivolts to 10 volts maximum. At some time, $T_o$, before the temperature at which reaction occurs, a start pushbutton is depressed causing the sample and hold circuits to store the value of the baseline at that time. At a later time, $T_s$, which can be selected as 1, 2, or 5 minutes after $T_o$, the baseline value is again stored. The difference between the two stored values when divided by the elapsed time is the slope of the baseline, and the second stored value is equal to the baseline at time $T_s$. These two quantities then define the extrapolated baseline. The baseline is generated by means of an integrator which integrates the slope starting from the initial value at $T_s$. Since the baseline is expected to deviate less than ±10 percent of full scale from the horizontal line, the baseline generating circuit is scaled to produce a signal five times larger than the actual signal and inverted in polarity. The extrapolated baseline is divided by 5 in resistance 5R and exactly cancels the original baseline in the difference amplifier. Between time $T_o$ and $T_s$, $h(t)$ is uncompensated; after $T_s$ the baseline integrator corrects the curve typically to better than 10 millivolt in the 10-volt full-scale range. The output of the difference amplifier ($h(t)$) is applied to the total area integrator after time $T_s$. After the total peak has been integrated, at time $T_h$, a hold pushbutton is depressed, terminating integration and holding the final integrated value. The integrator drift during the hold condition is completely negligible. If an undesired peak occurs before the main peak, a switch will permit the integration to be suppressed. A digital voltmeter is provided which will read the amplified input, the projected baseline, the height, or the total area. The digital display can be continuous or can be triggered at 1-, 2-, 5-, or 10-second intervals when reading $h(t)$. The 1-, 2-, 5-, or 10-second intervals are synchronized to the calorimeter temperature intervals by means of the differential scanning calorimeter temperature marker signal. A binary coded decimal output from the digital voltmeter can be used to drive a printer or paper tape punch if desired.

What I claim is:

1. A baseline compensating integrator comprising in combination (a) a baseline slope generator including two storage capacitors to store a voltage equal to a change in baseline value, and (b) a baseline initial value circuit connected to a storage capacitor, and (c) a baseline generator integrator receiving an input from both the baseline slope generator and baseline initial value circuit to generate a signal equal to the estimated change in a baseline signal, and (d) a baseline subtraction amplifier which subtracts the output of the baseline generator integrator from an input, said input also being applied through a relay to said baseline slope generator and to said baseline initial value circuit, and (e) a total area integrator connected to said baseline subtraction amplifier.

* * * * *